(12) United States Patent
Wareham et al.

(10) Patent No.: US 11,263,119 B2
(45) Date of Patent: Mar. 1, 2022

(54) JUST IN TIME SCRIPTLESS TEST AUTOMATION SELECTORS AND INTERACTIONS

(71) Applicant: ADP, Inc., Roseland, NJ (US)

(72) Inventors: Robert Wareham, Bristol (GB); Mohammed Ahmed, New York, NY (US); Richard Noad, New York, NY (US); Pi Lanningham, New York, NY (US)

(73) Assignee: ADP, Inc., Roseland, NJ (US)

( * ) Notice: Subject to any disclaimer, the term of this patent is extended or adjusted under 35 U.S.C. 154(b) by 150 days.

(21) Appl. No.: 16/405,288

(22) Filed: May 7, 2019

(65) Prior Publication Data
US 2020/0356467 A1 Nov. 12, 2020

(51) Int. Cl.
*G06F 11/36* (2006.01)

(52) U.S. Cl.
CPC ...... *G06F 11/3688* (2013.01); *G06F 11/3664* (2013.01); *G06F 11/3676* (2013.01); *G06F 11/3684* (2013.01)

(58) Field of Classification Search
CPC ............. G06F 11/3688; G06F 11/3664; G06F 11/3676; G06F 11/3684
See application file for complete search history.

(56) References Cited

U.S. PATENT DOCUMENTS

| 6,620,204 | B1 | 9/2003 | Malcolm | |
| 2002/0097268 | A1 | 7/2002 | Dunn et al. | |
| 2003/0056173 | A1 | 5/2003 | Copenhaver et al. | |
| 2013/0290786 | A1 | 10/2013 | Artz et al. | |
| 2017/0277625 | A1* | 9/2017 | Shtuchkin | G06F 11/3688 |
| 2020/0019583 | A1* | 1/2020 | Halfond | G06F 16/986 |

OTHER PUBLICATIONS

Wassermann et al., "Dynamic Test Input Generation for Web Applications," 2008 International Symposium on Software Testing and Analysis, Seattle, Washington, Jul. 20-24, 2008, pp. 249-259.
Artzi et al., "Finding Bugs in Web Applications Using Dynamic Test Generation and Explicit State Model Checking," Computer Science and Artificial Intelligence Laboratory Technical Report, Mar. 26, 2009, Massachusetts Institute of Technology, Cambridge, Massachusetts, 19 pages.
Leapwork, "Product Description: The Leapwork Automation Platform," copyright 2019, Leapwork.com, 13 pages.

* cited by examiner

*Primary Examiner* — Duy Khuong T Nguyen
*Assistant Examiner* — Mohammad H Kabir
(74) *Attorney, Agent, or Firm* — Yee & Associates, P.C.

(57) ABSTRACT

Test automation for a web page comprising specifying a number of tests for web page elements comprising specifying a test step for each of a number of web page elements on the web page. Each test step is stored as a metadata object containing a unique identifier for the web page, a unique identifier for the web page element to which the test step corresponds, and a required interaction for the web page element. A test step is selected to perform on a web page element, and the metadata for the element is extracted according to its unique identifier in the test step. An interpreter algorithm processes the metadata to determine what the web page element is, how best to identify the web page element, and commands to perform the required interaction and chooses a selector for the web page element. The test step is then executed.

21 Claims, 6 Drawing Sheets

JUST IN TIME SCRIPTLESS TEST AUTOMATION SELECTORS AND INTERACTIONS

BACKGROUND INFORMATION

1. Field

The present disclosure relates generally to an improved computer system and, in particular, to just in time test automation.

2. Background

Traditional test automation for web pages requires the author to decide upon the most suitable approach for identifying an element within a web page. There are multiple dentification mechanisms available such as, e.g., Cascading Style Sheet (CSS) Selector and XPath, and a decision must be made as which is most appropriate for a web page element. Determining a selector is a key skill of an automation tester that is often the result of many years of experience.

However, even after the author chooses an identification mechanism, the correct value for the identification mechanism must then be determined. There is no definite value, with innumerable options. Therefore, several rounds of trial interaction might be required to achieve the desired interaction. For example, to select a value from a text box, there might be a need to click the element, clear the element, and send keys to the element. This is dependent upon the user experience (UX) of the application. The choice of selector value and automation interactions should be reliable such that an update is not required for minor changes to data, UX, or HTML structure, but also able to fail when a change is made that breaks functionality for the user.

For more complex web page elements such as a "dropdown list" there might be more steps. Similar to the identification mechanism and identification value, deciding the suitable steps to create takes skill and experience.

Further complicating matters, once a selector has been chosen of a web page design it is based upon the state of the application at the time of creation and rapidly outdated due to development of applications and cannot react to changes in the user interface/user experiences (UI/UX). This is because the selector reflects the best choice at that point in the creative process. However, applications develop rapidly and can quickly require revisions. A restructuring of web page layout, change in style, or change in user interface framework can all lead to the need for re-investigation and updating, which again requires the skill of an experienced automation tester.

SUMMARY

An illustrative embodiment provides a computer-implemented method for test automation for a web page. The method comprises specifying a test step for each of a number of web page elements on the web page. Each test step is stored as a metadata object containing a unique identifier for the web page, a unique identifier for the web page element to which the test step corresponds, and a required interaction for the web page element. A test step is selected to perform on a web page element, and metadata for the web page element is extracted according to the unique identifier for web page element contained in the test step. An interpreter algorithm processes the metadata to determine what the web page element is, how best to identify the web page element, and commands to perform the required interaction. The interpreter algorithm then chooses a selector for the web page element according to analysis of the metadata, and the test step is executed.

Another illustrative embodiment provides a system for test automation for a web page. The system comprises a bus system, a storage device connected to the bus system, wherein the storage device stores program instructions, and a number of processors connected to the bus system, wherein the number of processors execute the program instructions to: specify a test step for each of a number of web page elements on the web page; store each test step as a metadata object containing a unique identifier for the web page, a unique identifier for the web page element to which the test step corresponds, and a required interaction for the web page element; select a test step to perform on a web page element; extracting metadata for the web page element according to the unique identifier for web page element contained in the test step; determine according to the metadata for the web page element, via an interpreter algorithm, what the web page element is, how best to identify the web page element, and commands to perform the required interaction; choose, via the interpreter algorithm, a selector for the web page element according to analysis of the metadata; and execute the test step.

Another illustrative embodiment provides a computer program product for test automation for a web page. The computer program product comprises a non-volatile computer readable storage medium having program instructions embodied therewith, the program instructions executable by a number of processors to cause the computer to perform the steps of: specifying a test step for each of a number of web page elements on the web page; storing each test step as a metadata object containing a unique identifier for the web page, a unique identifier for the web page element to which the test step corresponds, and a required interaction for the web page element; selecting a test step to perform on a web page element; extracting metadata for the web page element according to the unique identifier for web page element contained in the test step; determining according to the metadata for the web page element, via an interpreter algorithm, what the web page element is, how best to identify the web page element, and commands to perform the required interaction; choosing, via the interpreter algorithm, a selector for the web page element according to analysis of the metadata; and executing the test step The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that test automation for web page design typically requires the manual choice of identification mechanisms and the steps requires to achieve the required interaction, which requires many years of experience.

The illustrative embodiments further recognize and take into account that once a selector is chosen for test automation, it is based upon the state of the application at the time of creation and rapidly outdated due to development of applications and the need for continual updating. Illustrative embodiments protect against changes in the UX by storing the required interaction for a web page element rather than the steps to achieve it.

Illustrative embodiments provide a method for storing the intent of a step when an automation test is written, rather than the automation code itself. The most appropriate automation code for that intent is then generated at test execution time. An interpreter algorithm of the test step is updated to reflect changes in the user interface (UI) and user experience (UX) rather than the test step itself.

In the course of development of a web page, if the structure of the HTML changes, illustrative embodiments update the interpreter for the test engine to construct a new selector. Similarly, if the UX for performing an event is changes, the interpreter is updated. For example, if a web page element changes type (e.g., from a drop-down menu to text box), the interpreter will simply process the new control type, without the need for any updates. There is no requirement to revisit, review, and update existing test steps. Developers do not have to concern themselves with how test automation is executed but instead simply have to define their intent.

Figure 1:
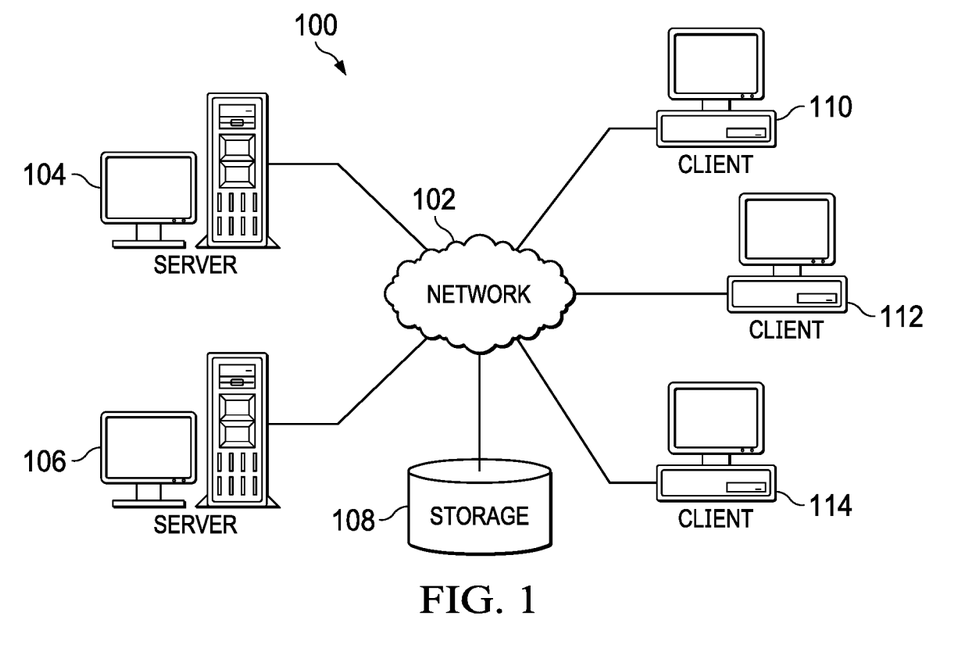
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
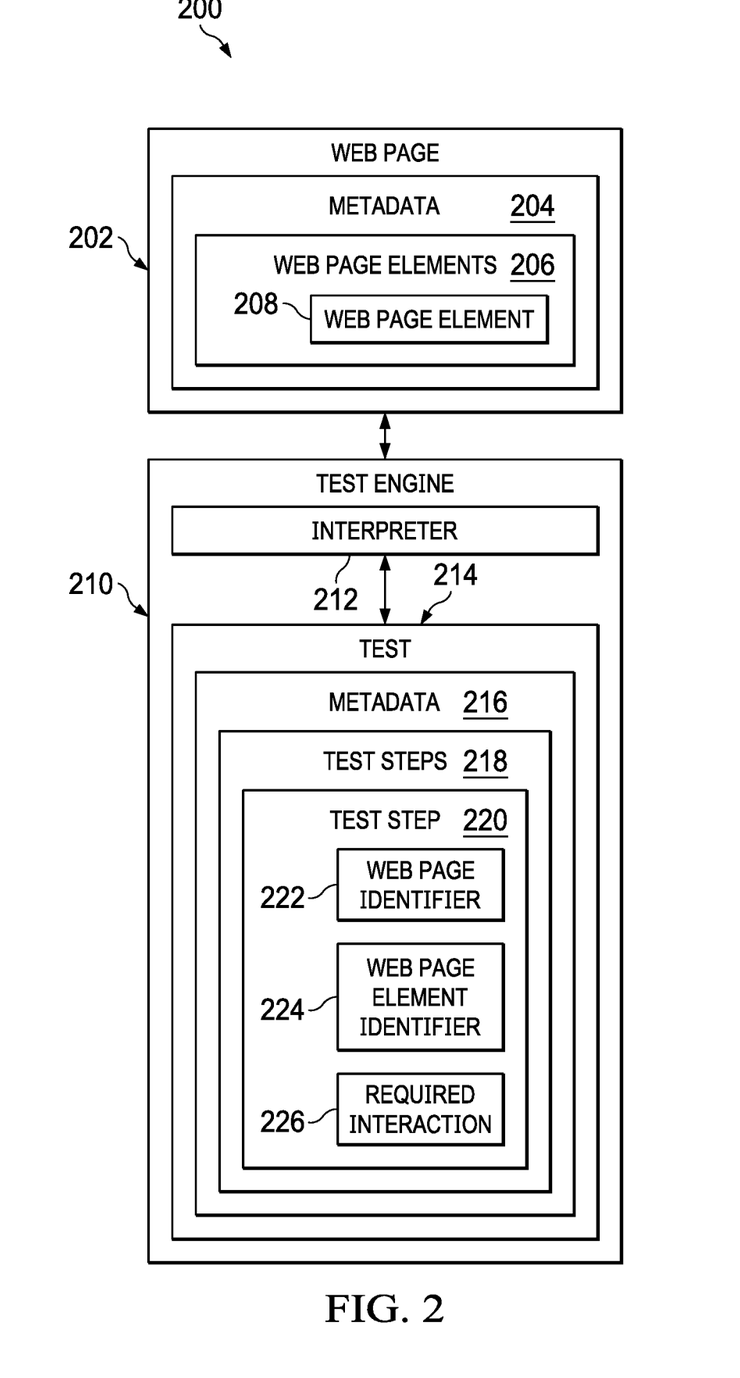
FIG. 2 is a block diagram of an automated web page testing in accordance with an illustrative embodiment.

Turning to FIG. 2, a block diagram of an automated web page testing system is depicted in accordance with an illustrative embodiment. System 200 comprises a web page 202 that is under development. The web page 200 is defined by metadata 204 that includes multiple page elements 206 such as images, structured documents, and interactive forms.

The functionality in the web page 202 is provided by the web page elements 206 defined within the metadata 204. An example is a drop-down menu that a user activates by holding a cursor over and/or clicking on it.

Automated testing of the web page 202 is provided by a test engine 210 that performs test 214 on web page 202. Test 212 comprises multiple test steps 218, which are metadata objects defined within the metadata 216 of test 214. Each web page element 208 has a corresponding test step 220. Each test step 220 comprises a unique web page identifier 222 and a unique web page element identifier 224. Test step 220 also comprises a required interaction 226 including any data necessary to achieve it. For example, a "Set Value" interaction also requires the value to be set, whereas a Click interaction requires no other data.

Instead of storing code for each test step 220, the illustrative embodiments store the test step as a metadata object. The metadata 216 embodies the intent behind each test step 220, which allows the entire structure of the web page 200 to change hierarchically and stylistically and for the test step 220 to automatically adapt at runtime without a need for offline refactoring.

At test execution time, the interpreter algorithm 212 in the test engine 210 interprets the metadata 216 to determine the intent of each test step 220 and generates the appropriate automation code for that intent. In illustrative embodiments, the interpreter 212 is updated to reflect changes in UI and UX rather than the test itself.

Figure 3:
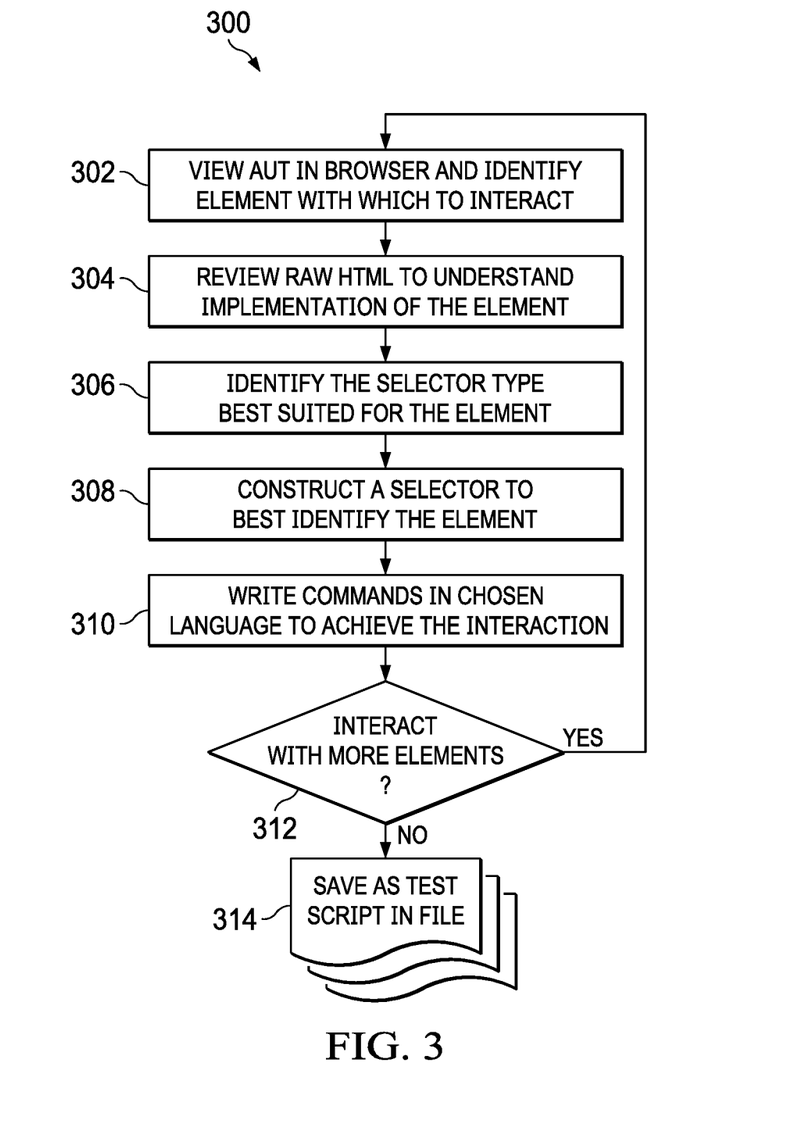
FIG. 3 is a flowchart depicting a standard process for writing an automated test for an application under test (AUT) in accordance with the prior art.

FIG. 3 is a flowchart depicting a standard process for writing an automated test for an application under test (AUT) in accordance with the prior art. Process 300 begins with the developer viewing the AUT in a browser and identifying the web page element with which to interact (step 302). From there, the developer reviews the raw HTML to understand the specific implementation of that element (step 304). Browser tools can assist with this step, but it still requires considerable knowledge of HTML on the part of the test author.

Next, the developer must identify the selector type that is best suited for the element (step 306). The chosen selector is imperative to successful automation. It must be reliable in that it will continue to identify the same element. The selector should also be "relaxed" enough so that a small change does not require it to be update, yet "strict" enough to ensure that defects are not hidden.

After the selector type is chosen, the developer must actually construct a selector to best identify the element in question (step 308). This requires not just experience of test automation but also in-depth knowledge of the AUT itself.

With the selector in place, the test author then writes a series of commands in a chosen language to achieve the necessary interaction for the element (step 310). It should be noted that at this point the developer is committing to both the selector and the specific commands needed to replicate the required interaction. These are correct per the AUT at the time of test creation but will typically become outdated very quickly as the application develops.

After constructing the selector and writing the commands, the developer determines if there are any other elements with which the developer wishes to interact (step 312). If yes, the process returns to step 302. If not, the test is saved as a test script in the file for future execution (step 414). Any changes to the UI or UX at this point will require revisiting the tests.

Process 300 has several disadvantages. The test author must have knowledge of HTML and be comfortable identifying elements in raw HTML. The author must also be experienced enough in automating to be able to create stable selectors that take future development of the application into account, as well as be comfortable writing code for the interaction commands. The test author requires the inner workings of the AUT in order to choose the right selectors.

Figure 4:
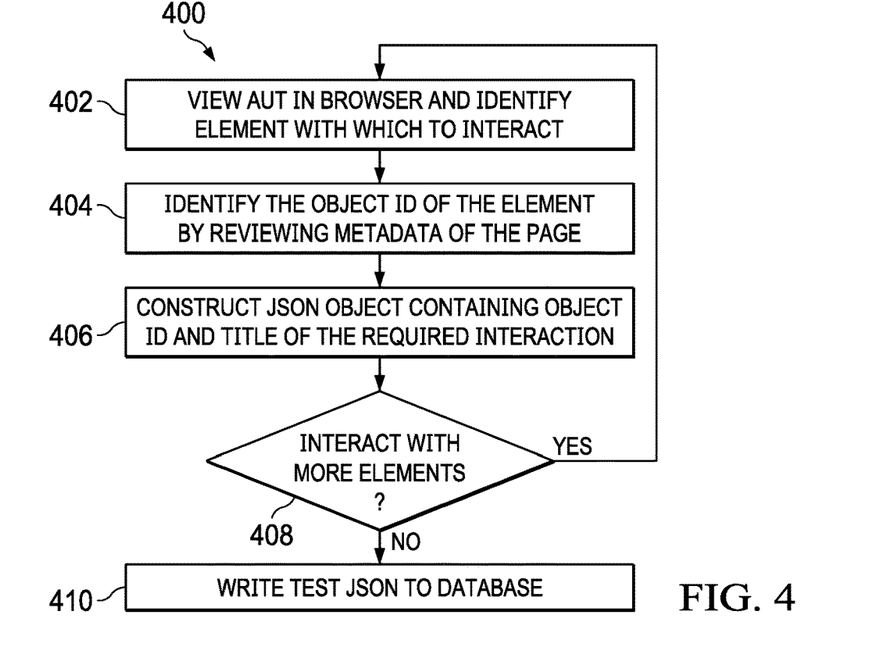
FIG. 4 is a flowchart illustrating the process of writing an automated test for an AUT in accordance with an illustrative embodiment.

FIG. 4 is a flowchart illustrating the process of writing an automated test for an AUT in accordance with illustrative embodiments. Process 400 begins with the developer viewing the AUT in a browser and identifying the web page element with which to interact (step 402). Next, the test author identifies the object ID of the element by reviewing the metadata of the web page in which the element is located (step 404). Illustrative embodiments simply this process by presenting the author with a tree view of the page, which displays the names of each element.

After the element is identified, the system constructs a Javascript Object Notation (JSON) object containing the object ID and the title of the required interaction (step 406). In this process the test author is presented with a series of supported interactions from which to choose, resulting in a simple JSON. It should be noted that at this stage the process of the illustrative embodiments does not require the author to commit to how the element is found nor how to achieve the required interaction.

After constructing the selector and writing the commands, the developer determines if there are any other elements with which the developer wishes to interact (step 408). If yes, the process returns to step 402. If not, the test JSON is written to a database (step 410). Storing each test step as metadata allows the entire structure of the web page to change hierarchically and stylistically and for the test step to automatically adapt at runtime without a need for offline refactoring. The entire test is now a single JSON document, which itself is identified by an object ID.

The process of writing automated tests provided by the illustrative embodiments provides the technical improvement of allowing an application developer to write an automated test without requiring knowledge of HTML, automation, or coding. Furthermore, process 400 only requires functional knowledge of the area under test without requiring understanding of the inner workings of the AUT. Whereas process 300 produces selectors and commands based on the current UI/UX, requiring revisiting if the UI/UX changes, process 400, in contrast, results in an object ID and required action saved in test step metadata, which does not require updating if the UI/UX changes. The metadata for the web page elements is independent of the web page interface.

Figure 5:
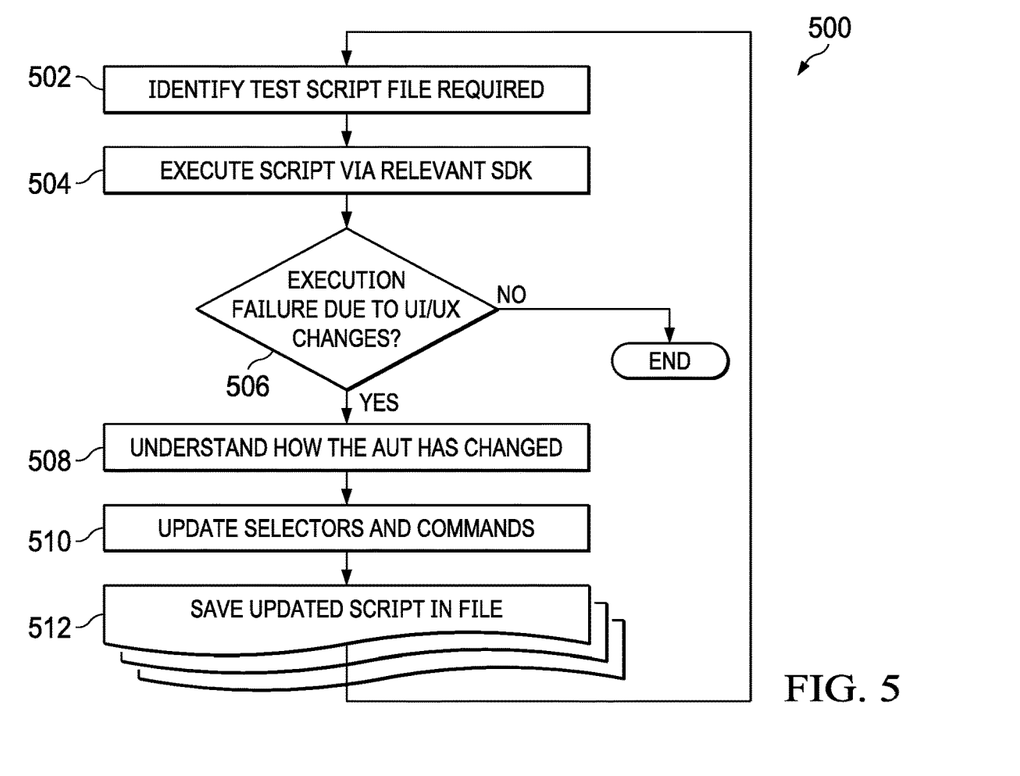
FIG. 5 is a flowchart depicting a standard process of executing an automated test for an AUT in accordance with the prior art.

Referring now to FIG. 5, a flowchart illustrates a standard process of executing an automated test for an AUT in accordance with the prior art. Process 500 begins by identifying the test script file required (step 502). In should be remembered that the script contains identifiers and commands based on the behavior of the AUT at the time of creation.

Next the script is executed via the relevant software development kit (SDK) (step 504). Examples of SDKs include, Java, Python, etc.

If there is an execution failure, the manual determination is made as to whether the failure is due to planned changes in the UI/UX (step 506). If the failure is not due to changes in the UI/UX, the process ends.

If the execution failure is attributed to changes in the UI/UX, the next step is to understand how the AUT has changed from the version for which the test was original written (step 508). A practical difficulty that can often arise in this process is that AUT has been changed by a different team than the team maintaining the test, which requires knowledge transfers between teams.

Once the changes in the UI/UX responsible for the execution failure are understood, the developer has to update the selectors and commands (step 510). This process requires application of the same skills and processes used when the creating test originally.

After updating the selectors and commands, the updated script is saved to the file (step 512). The scripts are now updated to reflect the newer version of the UI/UX as it currently stands. However, future changes to the UI/UX will require the same process to be repeated.

Process 500 suffers from similar disadvantages as process 300. The test can only reflect the UI/UX at the time of creation. Changes in the UI/UX will require the test to be updated. The process requires experience of design patterns required to avoid lengthy updates of individual tests. It also requires the need to fully understand the inner workings of changes to the AUT.

Figure 6:
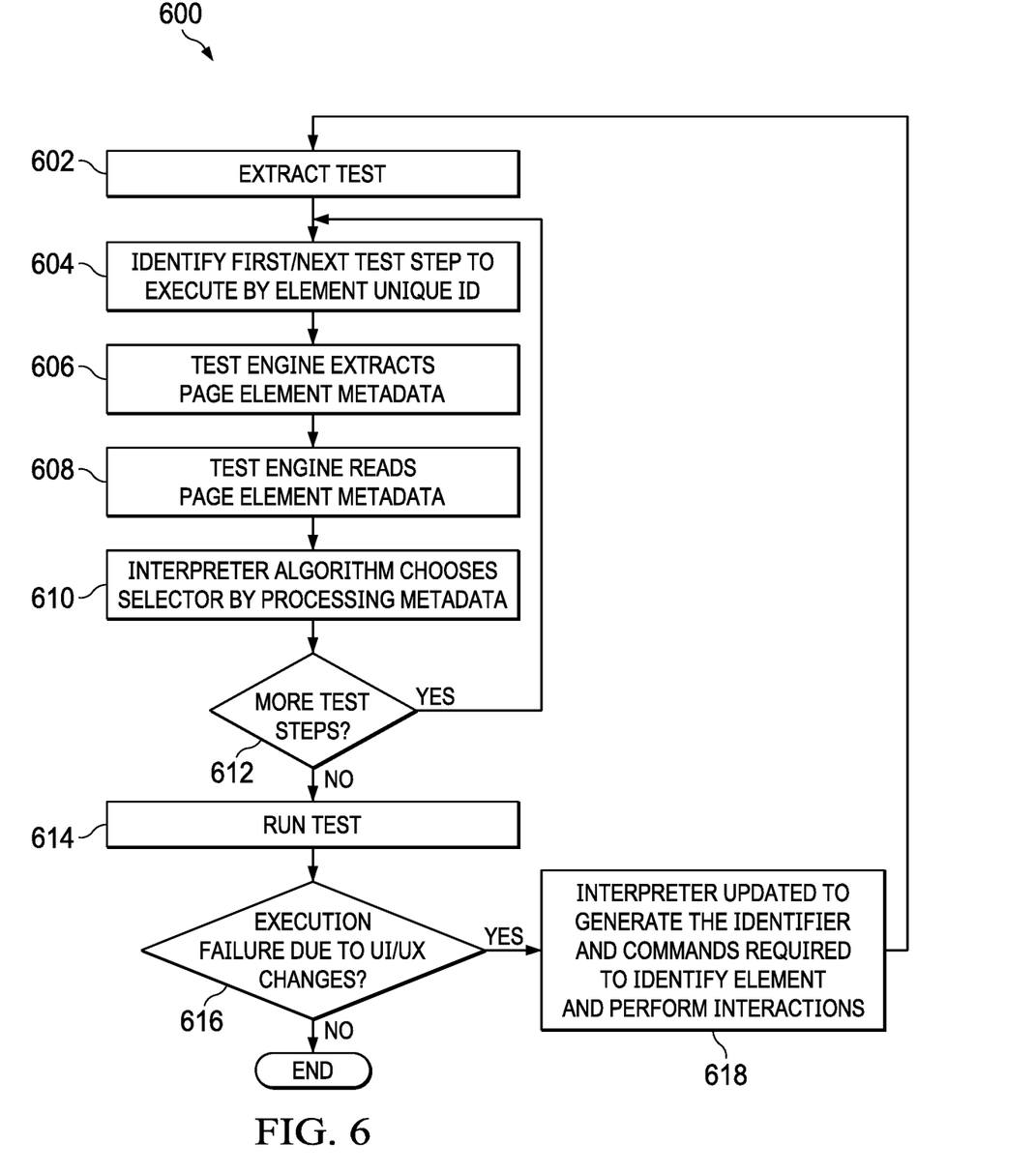
FIG. 6 is a flowchart depicting a process of executing an automated test for an AUT in accordance with an illustrative embodiment.

FIG. 6 is a flowchart depicting a process of executing an automated test for an AUT in accordance with illustrative embodiments. Process 600 begins by extracting the test to perform on the web page (step 602). Next, process 600 identifies the first/next test step to execute according to the unique ID of the web page element (step 604). The unique ID of the web page element is identified according to metadata of the web page.

After identifying the test step, the test engine extracts the metadata (JSON) of the web page element according to the unique ID (step 606). Everything in the platform, test, web page, page elements, etc., is described in the JSON. The metadata describing a web page does not exist to support testing but is used in being able to display the application itself.

Within the metadata, each test step defines the object ID of the web page element, the object ID of the web page in which the element exists, and the name of the interaction to perform. The metadata describing the web page element does not make any suggested as to how a web page element is selected or how an interaction is performed. There is no reference as to the UI/UX provided when the test was written.

The test engine then reads the metadata (JSON) for the web page element to decide what the element is, how best to identify the element, and the commands to perform the required interaction (step 608). Once it is understood what the element is (e.g., button, picklist, etc.), an interpreter algorithm within the test engine can combine this information with the test step metadata to understand fully what is to be achieved and how to perform it. In other words, the interpreter algorithm interprets the purpose/intent of the test step.

The interpreter algorithm then chooses a selector according to analysis of the metadata (step 610). The selector can be chosen from Cascading Style Sheet (CSS) Selector, XPath, link text, partial link text, or tag name. In metadata-driven, low-code platforms, the interpreter can take advantage of the fact that all elements of the same type behave in the same way. Therefore, selectors and commands are common. In this manner, the interpreter algorithm identifies a best performing selector on an element-by-element basis for the web page.

Process 600 then determines if there are any more steps in the test (step 612). If there are additional test steps, process 600 returns to step 604 and identifies the next step.

After selectors have been chosen for all web page elements, process 600 runs the test (step 614) and determines if there were any executions failures due to changes in the UI/UX (step 616). If there is no failure due to changes in the UI/UX, the process ends.

If there is an execution failure due to changes in the UI/UX the interpreter algorithm (not the test) is updated to generate the identifier and commands required to identify the element and perform the required interactions (step 618). Because the test itself is not updated, no new assumptions based on the UI/UX has to be added to the test database. The interpreter algorithm is simple enough to be maintained by the same team that updates the UI/UX itself. Therefore, any knowledge transfer about the updated application is captured in the updated interpreter rather than passed between teams.

Illustrative embodiments provide the technical improvement of not coupling the automate tests to the specific UI/UX. The test definition refers only to the element ID and the name of the interaction. The illustrative embodiments restrict the required knowledge of automation and coding to the team that owns the algorithm. Therefore, experience of automation and coding is encapsulated.

Figure 7:
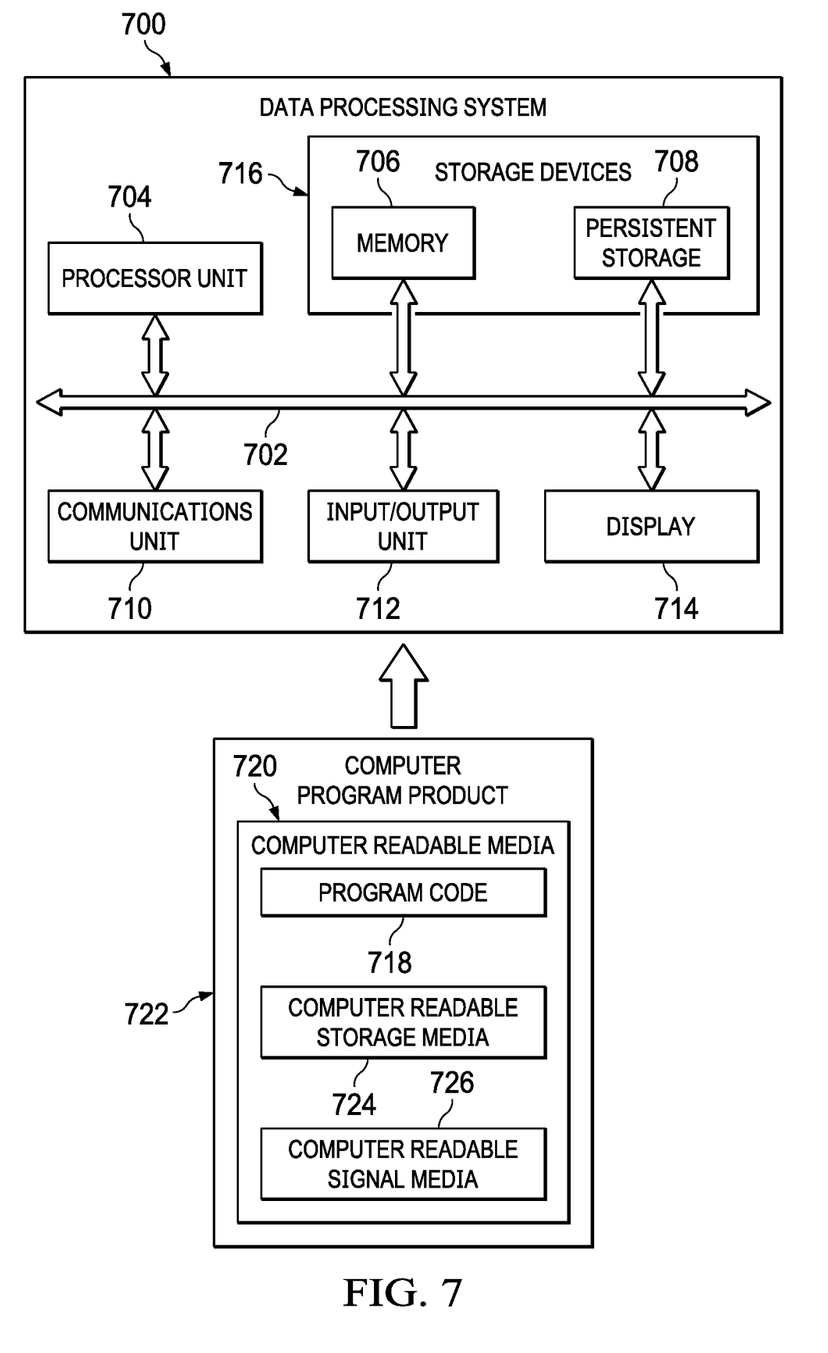
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers and client computer system 112 in FIG. 1. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method of test automation for a web page, the method comprising:

specifying, by a number of processors, a test step for each of a number of web page elements on the web page;
storing, by a number of processors, each test step as a metadata object containing a unique identifier for the web page, a unique identifier for the web page element to which the test step corresponds, and a required interaction for the web page element, wherein the metadata object identifies an intent of the required interaction without identifying commands to be executed for the test step;
selecting, by a number of processors, a test step to perform on a web page element;
extracting, by a number of processors, the metadata object for the web page element according to the unique identifier for web page element contained in the test step;
determining according to the metadata object for the web page element, by a number of processors via an interpreter algorithm, what the web page element is, how best to identify the web page element, and commands to be executed to perform the required interaction;
choosing, by a number of processors via the interpreter algorithm, a selector for the web page element according to analysis of the metadata object; and
executing, by a number of processors, the commands determined by the interpreter algorithm from the metadata object for performing the test step.

2. The method of claim 1, further comprising:
in response to an execution failure due to web page interface changes, updating, by a number of processors, how the interpreter algorithm identifies the web page element and determines commands to perform the required interaction, without changing the test step itself.

3. The method of claim 1, wherein each test step is stored as a JavaScript Object Notation (JSON) object.

4. The method of claim 1, wherein the metadata object for the web page element is independent of a web page interface.

5. The method of claim 1, wherein the unique identifier of the web page element is identified according to metadata object of the web page.

6. The method of claim 1, wherein the selector is chosen from the following:
Cascading Style Sheet Selector;
XPath;
Link text;
Partial link text; or
Tag name.

7. The method of claim 1, wherein interpreter algorithm identifies best performing selectors on an element-by-element basis for the web page.

8. A system for test automation for a web page, the system comprising:
a bus system;
a storage device connected to the bus system, wherein the storage device stores program instructions; and
a number of processors connected to the bus system, wherein the number of processors execute the program instructions to:
specify a test step for each of a number of web page elements on the web page;
store each test step as a metadata object containing a unique identifier for the web page, a unique identifier for the web page element to which the test step corresponds, and a required interaction for the web page element, wherein the metadata object identifies an intent of the required interaction without identifying commands to be executed for the test step;
select a test step to perform on a web page element;
extracting the metadata object for the web page element according to the unique identifier for web page element contained in the test step;
determine according to the metadata object for the web page element, via an interpreter algorithm, what the web page element is, how best to identify the web page element, and commands to be executed to perform the required interaction;
choose, via the interpreter algorithm, a selector for the web page element according to analysis of the metadata object; and
execute the commands determined by the interpreter algorithm from the metadata object for performing the test step.

9. The system of claim 8, wherein the number of processors further execute program instructions to:
in response to an execution failure due to web page interface changes, update how the interpreter algorithm identifies the web page element and determines commands to perform the required interaction, without changing the test step itself.

10. The system of claim 8, wherein each test step is stored as a JavaScript Object Notation (JSON) object.

11. The system of claim 8, wherein the metadata object for the web page element is independent of a web page interface.

12. The system of claim 8, wherein the unique identifier of the web page element is identified according to metadata object of the web page.

13. The system of claim 8, wherein the selector is chosen from the following:
Cascading Style Sheet Selector;
XPath;
Link text;
Partial link text; or
Tag name.

14. The system of claim 8, wherein interpreter algorithm identifies best performing selectors on an element-by-element basis for the web page.

15. A computer program product for test automation for a web page, the computer program product comprising:
a non-volatile computer readable storage medium having program instructions embodied therewith, the program instructions executable by a number of processors to cause the computer to perform the steps of:
specifying a test step for each of a number of web page elements on the web page;
storing each test step as a metadata object containing a unique identifier for the web page, a unique identifier for the web page element to which the test step corresponds, and a required interaction for the web page element, wherein the metadata object identifies an intent of the required interaction without identifying commands to be executed for the test step;
selecting a test step to perform on a web page element;
extracting the metadata object for the web page element according to the unique identifier for web page element contained in the test step;
determining according to the metadata object for the web page element, via an interpreter algorithm, what the web page element is, how best to identify the web page element, and commands to be executed to perform the required interaction;

choosing, via the interpreter algorithm, a selector for the web page element according to analysis of the metadata object; and executing the commands determined by the interpreter algorithm from the metadata object for performing the test step.

16. The computer program product of claim 15, the program instructions further cause the computer to perform the step of:

in response to an execution failure due to web page interface changes, updating how the interpreter algorithm identifies the web page element and determines commands to perform the required interaction, without changing the test step itself.

17. The computer program product of claim 15, wherein each test is stored as a JavaScript Object Notation (JSON) object.

18. The computer program product of claim 15, wherein the metadata object for the web page element is independent of a web page interface.

19. The computer program product of claim 15, wherein the unique identifier of the web page element is identified according to metadata object of the web page.

20. The computer program product of claim 15, wherein the selector is chosen from the following:

Cascading Style Sheet Selector;
XPath;
Link text;
Partial link text; or
Tag name.

21. The computer program product of claim 15, wherein interpreter algorithm identifies best performing selectors on an element-by-element basis for the web page.

* * * * *